Nov. 4, 1969  R. J. DITLINGER ET AL  3,475,988
END FITTING FOR TIE BAR
Filed Feb. 8, 1968  2 Sheets-Sheet 1
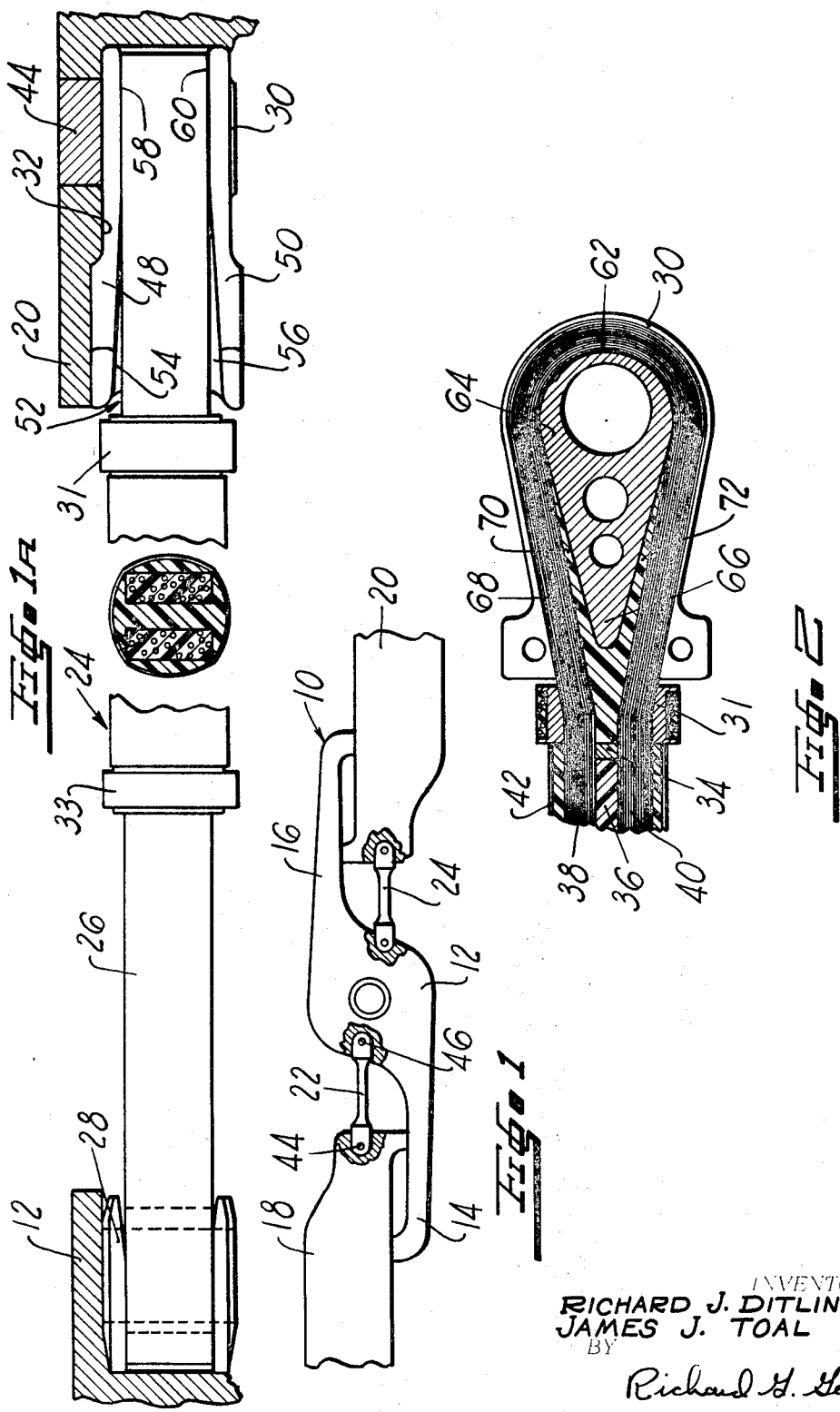
INVENTORS
RICHARD J. DITLINGER
JAMES J. TOAL
BY
Richard G. Geib
ATTORNEY Nov. 4, 1969  R. J. DITLINGER ET AL  3,475,988
END FITTING FOR TIE BAR Filed Feb. 8, 1968  2 Sheets-Sheet 2

INVENTORS
RICHARD J. DITLINGER
JAMES J. TOAL
BY
Richard G. Geib
ATTORNEY

United States Patent Office 3,475,988
Patented Nov. 4, 1969

3,475,988
END FITTING FOR TIE BAR
Richard J. Ditlinger, South Bend, and James J. Toal, Mishawaka, Ind., assignors to The Bendix Corporation, a corporation of Delaware
Filed Feb. 8, 1968, Ser. No. 703,996
Int. Cl. G05g 1/00; F16c 35/00
U.S. Cl. 74—579
9 Claims

ABSTRACT OF THE DISCLOSURE

An end fitting for a tie bar coupling such as is used, for example, in a helicopter rotor system for connecting the rotor blades and rotor arm assemblies consisting of endless loops of laminated, adhesively integrated, parallel arranged filaments, which end fitting accommodates the change in direction of the filaments within the flanges thereof which is caused by bending moments created by movement of one structure that is connected to another structure by the coupling.

Summary

While this invention may well be utilized in coupling two members which must have tension and torsional restraint plus the accommodation of bending moments created by vertical displacement of one member with respect to another or horizontal displacement depending upon the attitude of the coupling, it has particular significance to the helicopter field wherein a fixed rotor system is employed.

Other types of prior art couplings for which this invention constitutes an improvement too are shown in the U.S. Patents Nos. 3,279,278 and 3,228,481 which are manufactured from tapes in accordance with the principles of U.S. Patent No. 3,189,510, all of which are assigned to the common assignee of this invention.

The fixed-rotor system for helicopters finds particular need for this invention in that there is permissible movement in only one axis, namely, that of rotating about the longitudinal axis of the blades to adjust the pitch or angle of attack of the rotor blades. The other motions to which the blade is subjected, which are normally accommodated in fully articulated rotor systems, and which are familiarized as a lead-lag and flapping motion imparted by external aerodynamic forces prevailing in the rotor plane of rotation are still present in the fixed rotor system in a limited degree. Therefore, any coupling between the rotor arm assembly and the rotor blade will have to accommodate these movements and forces that cause them.

It was and still is believed that my copending U.S. patent application Ser. No. 658,094 was one method of coupling such elements as the blade and rotor hub of a fixed helicopter rotor system, and this invention is no way intended as to be other than another method for accomplishing the same ends as is in my copending application which, by the way, is assigned to the common assignee of this patent application.

Accordingly, it is a principal object of this invention, as with my other invention disclosed in the aforementioned U.S. patent application, to provide a tie bar coupling with an end fitting which will accommodate bending moments while providing tension and torsional restrain for the elements connected thereby.

Drawing description

FIGURE 1 is a schematic illustration of a typical rotor system employing the tie bar coupling in accordance with the principles of this invention;

FIGURE 1A is a side view of a tie bar coupling with the end fitting in accordance with the principles of my invention that is partially broken away at the center to show the cross sectional profile of the center section of the tie bar coupling;

FIGURE 2 is a cross sectional plan view of the end fitting in accordance with the principles of this invention around the laminated side portions of the tie bar extending around the end fitting being shown;

Detailed description

Figure 3:
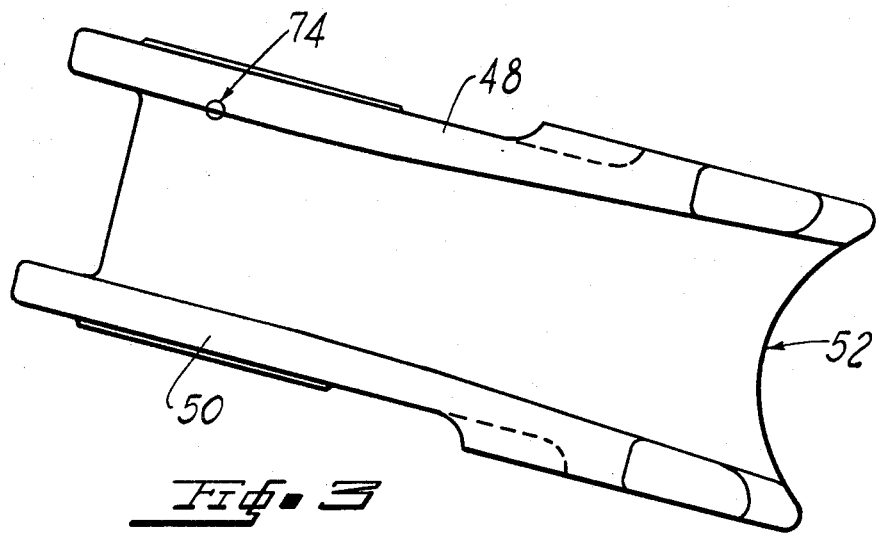
FIGURE 3 is a side view of the end fitting of FIGURES 1A and 2.

With more particular reference to FIGURE 1 there is shown a helicopter rotor system 10 having a rotor hub 12 with arms 14 and 16 hingedly connected to helicopter rotor blades 18 and 20 and coupled therewith by means of tie bars 22 and 24.

The tie bar 24 is shown in FIGURE 1A to comprise an endless loop of adhesively integrated filaments maintained in a parallel pattern (see the cross sectional profile of the center section cut away in this figure) which is wrapped around and bonded to end fittings 28 and 30. It should be noted that the end fitting 30 is provided with a grooved portion receiving a projecting ear at the surface 32 which acts as a key to prevent rotation of the end fittings 30 when installed to the helicopter blade 20.

Aside from the bushing or end fitting designs, the tie bar 26 is formed substantially as disclosed in my copending U.S. patent application Ser. No. 532,989, now Patent No. 3,370,483, to have its center portion drawn together so that the sides thereof are spaced but a small distance from the centerline of the tie bar. This will provide greater torsional flexibility than in designs of an open center type tie bar as is disclosed in the U.S. Patents Nos. 3,228,481 and 3,279,278 aforementioned. However, it should be noted that the end fittings or bushings 28 and 30 of this invention may be equally advantageous to an open-center type tie bar as is disclosed in these patents.

In any event and with reference now to FIGURE 3, the tie bar is shown to be drawn together by a ring 31 adjacent the mouth of the end fitting 30 which ring is positioned by means of a rectangular pin 34 held by an elastomeric filler 36 which also encapsulate the sides 38 and 40 of the adhesively integrated lamination of filaments to provide an outer surafce 42 for the central section between rings 31 and 33 (see FIGURE 1A).

With reference back again now to FIGURES 1A and 1 the end fittings 28 and 30 are joined to the respective blade 18 and hub 12 or blade 20 and hub 12 by means of pins 44 and 46. The end fittings 30 have upper and lower flanges 48 and 50 which at the mouth 52 of the end fitting 30 are diverging from one another to provide tapered spaces 54 and 56 above and below the sides 38 and 40 of the tie bar. These tapered spaces 54 and 56 begin at the centerline of the bushing aperture receiving pins 44, at which point the diverging surfaces of the upper and lower flanges 48 and 50 become tangent with the parallel surfaces 58 and 60 of the flanges extending around the bearing surface 62 (see FIGURE 2) of the central body 64 of the bushing 30.

Going now to FIGURE 2 again, the central body 64 is shown to be essentially of a teardrop shape having a tapering nose section 66 opposite the bearing surfaces 62. Between this tapering nose section 66 and the facing surfaces of the sides 38 and 40 of the adhesively integrated filament laminations and adhesive 68 is teared to provide wear surfaces 70 and 72 for the facing surfaces of the sides 38 and 40 between them and the tapered nose section 66. This adhesive 68 also unites, as does the adhesive integrating the filaments within the tie bar 26, the tie bar to the end fitting between the flanges thereof.

Figure 4:
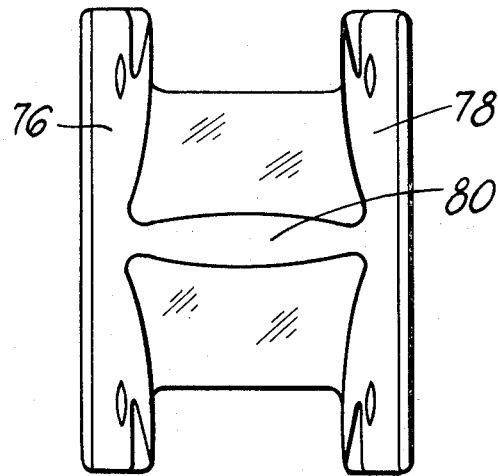
FIGURE 4 is an end view of the end fitting of FIGURE 3.

With reference now to FIGURE 3 the tapering surface of the flanges 48 and 50 are shown to begin from the point 74 and continue outwardly to the mouth 52 of the end fitting. In the end view shown by FIGURE 4, the diverging surfaces are opening out towards the viewer. In this figure these surfaces are numbered 76 and 78 with the nose of the body 64 being numbered as 80.

It will be readily obvious to those concerned with the art to which this invention applies that the invention herein disclosed provides an end fitting where the change in direction of the filaments in the tie bar takes place within the confines of the bushing flanges 48 and 50. This has a distinct advantage over the prior art which permitted this filament change in direction to occur outside the flanges creating a small radius in the filament pack with attendant high stresses.

Having fully described an operative construction of this invention it is now desired to set forth the intended protection sought by these Letters Patent in the appended claims.

We claim:

1. For use in a coupling member between fixed and movable structure, which coupling has a laminated loop about end fittings, a bushing forming one of the end fittings which connects the loop to the movable structure, said bushing comprising:
    an elongated body having a rounded end and a tapered nose facing the other end fitting with an aperture therethrough adjacent said rounded end; and
    flanges above and below said body having divergent facing surfaces from the centerline of the aperture to the nose and parallel facing surfaces from said centerline about said rounded end, with said divergent surface being tangent to said parallel surfaces at said centerline.

2. The structure of claim 1 and further comprising a resilient structure between the sides of the loop and said tapered nose of the body.

3. The structure of claim 1 and further comprising a resilient means between the sides of the loop about said tapered nose of the body from the point of change of said body to the rounded end.

4. In a connecting attachment for joining a relatively inflexible structure to a movable structure which is subjected to high tensile stress and some degree of torque and bending forces, a tension-torsion tie bar having a lamination of adhesively integrated filaments looped about and joined to spaced bushings connecting said lamination to the respective structure, said bushings at the connection with the movable structure being comprised of:
    a teardrop body; and
    upper and lower flanges having facing surfaces diverg- from the center of curvature of a rounded end of said teardrop body towards a tapered end thereof with said facing surfaces being parallel about the rounded end from a point of tangency of a radius of curvature of the diverging faces at said center of curvature.

5. The structure of claim 4 and further comprising a resilient filler from the point of departure of said laminations with said tapered body and about the tapered end between facing sides of said laminations.

6. The structure of claim 5 wherein said resilient filler is characterized as a urethane providing a wear resistant surface for the sides of the laminations between them and the body, which urethane integrates with the adhesive of the said laminations.

7. The structure of claim 6 wherein said sides of said laminations are in non-overlapping parallel pattern between said spaced bushings.

8. An end fitting for attaching a tie bar to a helicopter rotor blade, said end fitting comprising:
    a shaped body having a bearing surface for said tie bar wrapped therearound;
    an upper flange and a lower flange on said body each having facing surfaces which present a diverging mouth for receiving the tie bar on each side of said body and each flange having parallel surfaces about the bearing surface prescribing the vertical and lateral dimensions of the tie bar at the helicopter rotor blade; and
    an adhesive about said body opposite said bearing surface thereof spanning said mouth uniting said tie bar and end fitting providing a wear surface between that portion of said body and facing sides of said tie bar.

9. The structure of claim 8 and further comprising an annular bushing for said tie bar at the end opposite said end fitting with said tie bar extending therearound between flanges thereof, which bushing is attached to the rotor hub whereby said tie bar is a tension-torsion coupling of said blade and said hub.

References Cited
UNITED STATES PATENTS

| | | | |
|---|---|---|---|
| 715,448 | 12/1902 | Willson | 308—27 |
| 2,066,187 | 12/1936 | Piron | 308—26 |
| 2,487,653 | 11/1949 | Heintze | 308—26 |
| 2,628,854 | 4/1958 | Cibula | 74—230.11 |
| 3,112,963 | 12/1963 | Cardwell | 308—27 |
| 3,279,278 | 11/1966 | Eldred | 74—579 |
| 3,362,253 | 1/1968 | Ditlinger | 74—579 |

FRED C. MATTERN, Jr., Primary Examiner
W. S. RATLIFF, Jr., Assistant Examiner

U.S. Cl. X.R.
308—15, 26